(12) United States Patent
Jacobo et al.

(10) Patent No.: US 8,110,084 B2
(45) Date of Patent: Feb. 7, 2012

(54) ELECTRODE CHARACTERIZED BY HIGHLY ADHERING SUPERFICIAL CATALYTIC LAYER

(75) Inventors: Rubén Ornelas Jacobo, S. Giuliano Milanese (IT); Giuseppe Faita, Novara (IT); Lawrence Gestaut, Lebanon, NJ (US); Corrado Mojana, Valmadrera (IT)

(73) Assignee: Industrie de Nora S.p.A., Milan (IT)

( * ) Notice: Subject to any disclaimer, the term of this patent is extended or adjusted under 35 U.S.C. 154(b) by 1584 days.

(21) Appl. No.: 10/446,364

(22) Filed: May 28, 2003

(65) Prior Publication Data

US 2003/0205462 A1 Nov. 6, 2003

Related U.S. Application Data

(62) Division of application No. 09/859,080, filed on May 16, 2001, now Pat. No. 6,589,406.

(30) Foreign Application Priority Data

Jun. 9, 2000 (IT) .............................. MI2000A1287

(51) Int. Cl.
*C25B 11/08* (2006.01)
(52) U.S. Cl. .......... 205/80; 205/621; 205/636; 205/637; 205/638
(58) Field of Classification Search .................... 205/80, 205/621, 636–638
See application file for complete search history.

(56) References Cited

U.S. PATENT DOCUMENTS

| 5,672,394 A * | 9/1997 | Hardee et al. | 204/290.13 |
| 6,217,729 B1 * | 4/2001 | Zolotarsky et al. | 204/290.08 |
| 6,589,406 B2 * | 7/2003 | Jacobo et al. | 204/290.14 |

\* cited by examiner

*Primary Examiner* — Arun S Phasge
(74) *Attorney, Agent, or Firm* — Charles A. Muserlian

(57) ABSTRACT

The invention is relative to an electrode for gas evolution in electrolytic and electrometallurgical industrial applications, made of a metal substrate having a surface morphology characterized by a combination of micro-roughness and macro-roughness which favors high adherence of a superficial catalytic layer in order to prevent detachment of the same and passivation of the substrate even under critical operating conditions.

7 Claims, No Drawings

ELECTRODE CHARACTERIZED BY HIGHLY ADHERING SUPERFICIAL CATALYTIC LAYER

PRIOR APPLICATION

The application is a division of U.S. patent application Ser. No. 09/859,080 filed May 16, 2001, now U.S. Pat. No. 6,589,406.

Known in the art are several industrial applications, of electrolytic or electrometallurgical type, which use electrodes deputed to the evolution of a gaseous product, whose production constitutes in some cases the main object of the process (such as chlorine evolved at the anode in the electrolysis of alkali chloride or hydrochloric acid). In other cases, the evolved gas is a simple reaction by-product (such as hydrogen evolved at the cathode in the alkali chloride electrolysis, or oxygen evolved at the anode in the cathodic metal electroplating, typically in the galvanic industry). In both cases, one of the main goals in the production of gas evolving electrodes is the high electrochemical activity, which must permit to operate with overvoltages as low as possible in order to increase the overall energy efficiency of the process. It is therefore customary to carry out such reaction on catalysed surfaces, also when the gas evolved at the electrode is a mere by-product. As the materials with the best electrocatalytic properties are very expensive, this category fundamentally consisting of the platinum group metals and their oxides, their use is limited to thin surface layers deposited on a conductive matrix. In particular, it is well known to the experts in the art the use of metal substrates combining good conducting characteristics and resistance to corrosion, having at least one surface coated with a thin layer of noble metals and/or oxides or alloys thereof; embodiments of this kind are described for example in patents such as U.S. Pat. Nos. 3,428,544, 3,711,385, and many others. Resistance to corrosion is a very critical parameter especially in the case of electrodes suitable for operating as anodes, where the aggressive action of the electrolytes is enhanced by the electrochemical potential. For this reason, the anodes for industrial electrolytic and electrometallurgical applications are made preferably starting from valve metal substrates, that is metals resisting to corrosion in view of the protection imparted by a thin superficial layer of inert oxide. Among these valve metals, the most commonly used is titanium, due to considerations of cost and workability. The electrochemical characteristics of titanium substrates coated with catalysts based on noble metal oxides are commonly considered as more than satisfactory as anodes for gas evolution in nearly all industrial applications. Conversely, their lifetime, especially in the most critical operating conditions (very aggressive electrolytes, very high current density, etc.) constitutes, in many cases, a problem still not completely solved, although an exhaustive technical literature witnesses the fundamental progresses made in this field. A long electrode lifetime is the essential condition for the industrial success in electrochemical applications, not only because in case of deactivation a new electrocatalytic coating must be applied, which is expensive on one hand in terms of material and manufacture, and on the other hand in view of the production loss associated with the shut-down of the plant during electrode replacement. As the noble metals used in the formulation of the electrocatalytic coatings are per se immune from corrosion in the usual operating conditions, the main cause of deactivation consists in the local detachment of the coating from the substrate, with the consequent corrosion or passivation of the latter. This detachment is favoured by the same gas evolution, due to the mechanical action of the bubbles generated on the surface, and the phenomenon is further increased at high current density. In particular, in some electrometallurgical applications with anodic evolution of oxygen, for example in the zinc plating of sheets for use in the automobile industry or in the production of thin copper foils for the electronic industry, the anodic current density exceeds 15 kA/m$^2$.

Another source of instability for the adhesion of the coating to the substrate may derive from the porosity of the former, allowing infiltration of the electrolyte in direct contact with the non protected metal substrate. In such cases, if localised detachment occurs even in microscopic areas, the substrate may passivate, forming an often scarcely conductive oxide, which grows between the substrate and the electrocatalytic layer without any major physical detachment of the latter taking place.

In order to obtain a sufficient anchoring of the catalytic coating, it has been found advantageous since the advent of this type of electrodes to provide a certain superficial roughening of the substrate, for example by means of a sandblasting treatment, or by controlled etching with a corrosive agent. The surface roughness favours the reciprocal intermixing of the substrate and the catalyst, the latter being obtained by thermal treatment of a precursor compound in the form of a paint applied to the substrate. In the case of titanium, for example, well known are the abrasive treatment made with sand, sand mixed with water or corindone, and the etching with hydrochloric acid; these procedures permit to obtain electrodes suitable for use in some industrial applications, with the provision that the electrodes still need to be subjected to rather frequent periodical reactivation. In this regard, the electrometallurgical processes with anodic evolution of oxygen are to be mentioned among the most penalised applications, especially in the case of operation at a current density higher than 10 kA/m$^2$. Also for low current density processes, however, as in the case of electrowinning of metals from acidic solutions deriving from the primary dissolution of minerals, problems arise albeit of a different nature; among these are those associated with the impurities always present in the electrolytic baths, some of which have an extremely deleterious effect on the passivation of titanium substrates. A typical example is given by fluoride ions, capable of complexing titanium, thus destroying the relevant protective film with the consequent corrosion of the underlying metal matrix, especially in the areas previously exhibiting micro-defects in the adhesion of the electrocatalytic coating to the substrate.

For this reason the use of interlayers with suitable characteristics for inhibiting corrosion, interposed between the metal substrate and the electrocatalytic coating, has been proposed in several cases under different forms, aimed at blocking the localised corrosive attack taking place where the inevitable micro-defects are present in correspondence of such barrier. An example of interlayer, based on ceramic oxides of valve metals, is described in European Patent EP 0 545 869, but other examples of interlayers are known in the art.

The use of an interlayer is often decisive to increase the lifetime of the gas evolution electrodes to a great extent. However, this is not free from inconveniences. The ceramic oxides, for example, have an electric conductivity lower than that of titanium and of the materials used for electrocatalytic coatings, thus introducing resistive penalties which negatively affect the overall electric efficiency of the process; furthermore, they may alter the surface morphologic characteristics, as they mask the underlying rough surface with a negative influence on the adherence of the catalytic coating. The control of their thickness and of the overall morphologic characteristics after their deposition is therefore mandatory. The definition of the optimum roughness parameters of electrodic substrates suitable for applying an electrocatalytic coating thereto is disclosed for example in EP 0 407 349, assigned to Eltech Systems Corporation, USA, where it is specified that, in order to ensure a high quality adhesion of the coating, an average surface roughness not lower than 250 microinches (about 6 micrometers), with an average frequency of at least 40 peaks per inch (basis a profilometer upper threshold limit of 400 microinches, that is about 10 micrometers, and a lower threshold limit of 300 microinches, that is about 8 micrometers) is needed. Such roughness is obtained by etching, in order not to damage the surface with abrasive treatments, such as sandblasting and the like.

This limitation is easily understandable when the two fundamental characteristics of the claimed surface profile are taken into account, namely the average roughness and the frequency, the latter being, in more common terms, the population of peaks observed on a reference length, for example 1 cm. The indicated average roughness may indeed be obtained without much difficulty also by sandblasting, provided that the abrasive powder has a suitable particle size. The resulting inconvenience is a strong hardening of the metal with the relevant internal stresses, which may be released by a subsequent annealing treatment at 500-700° C. in the case of titanium. Obtaining the frequency, or population of peaks, is conversely rather problematic and requires a careful optimisation of the sandblasting parameters, such as the type of nozzle, the pressure of the air jet, the distance and the angling of the nozzle with respect to the metal surface, as well as prolonged treatment duration. This last factor in particular causes the nucleation of surface defects such as micro-cracks or bendings which constitute the starting points for the so-called "crevice corrosion" during operation as the anode. Furthermore, checking that the desired frequency or population of peaks is actually achieved requires long times which increase the production cost and are intrinsically problematic, as the best results are obtained not only when the number of peaks per centimeter is the desired one, but also when the peaks are distributed in a more or less uniform way and not clustered together, thereby leaving some residual areas with insufficient roughness. In any case, although the teaching of EP 0 407 349 is important to provide the substrate with the best possible morphology, it still remains insufficient to impart an adequate lifetime to the electrodes, and especially to the anodes, for many critical industrial applications. For this reason, a subsequent European Patent (EP 0 576 402) by the same applicant demonstrates that the use of the roughness parameters of EP 0 407 349, combined with an interlayer based on ceramic oxides which in its turn retains the same surface parameters to allow the correct anchoring of the catalytic coating, prolongs the electrode lifetime to a surprising extent. However, even at first sight the applicability of such invention appears extremely problematic as, in addition to the cited problems associated with the difficulty of obtaining the roughness of EP 0 407 349 it is also required that the interlayer be, on one hand, sufficiently protective, and on the other hand, not so thick as to modify the surface roughness parameters. In this regard, claim 1 of EP 0 576 402 specifies that the method for producing the electrode requires a check of the surface roughness after the interlayer deposition and before the coating application. It is evident therefore that it is necessary to operate within very strict parameters, which are also difficult to control; moreover, checking the roughness after deposition of the interlayer grants the optimum morphology for adhesion of the subsequent electrocatalytic coating, but not the fact that the same interlayer is compact and coherent enough to perform its protective function effectively over the whole electrodic surface.

It has been therefore demonstrated how in the prior art there exists the need to identify a configuration of electrode based on a metal substrate provided with superficial morphological characteristics suitable for obtaining the best anchoring of an electrocatalytic coating thereto, at the same time preserving said substrate from passivation phenomena, even in critical operating conditions, without having to rely on overly expensive and complex surface pre-treatment procedures and without any interlayer between the substrate and the electrocatalytic coating.

It is an object of the present electrode to provide an electrode for gas evolution comprising a metal substrate having a controlled surface morphology and an electrocatalytic coating without any interlayer, capable of overcoming the limitations of the prior art.

Under another aspect it is an object of the present invention to provide a method for the preparation of an electrode for gas evolution which comprises a metal substrate having a controlled surface morphology and an electrocatalytic coating without any interlayer.

Under another aspect it is an object of the present invention to provide an electrolytic process making use of at least one electrode for gas evolution which comprises a metal substrate having a controlled surface morphology and an electrocatalytic coating without any interlayer, on whose surface a reaction of evolution of a gaseous product takes place.

Under another aspect it is an object of the present invention to provide an electrometallurgical process of cathodic metal plating making use of at least one anode which comprises a metal substrate having a controlled surface morphology and an electrocatalytic coating without any interlayer, on whose surface a reaction of evolution of a gaseous product, for example oxygen, takes place.

These and other purposes will be evident from the description and from the following examples.

The invention consists of an electrode comprising a metal substrate, preferably made of a valve metal as such or alloyed with at least another metal chosen in the group of other valve metals, transition metals, noble metals of the platinum group and, more preferably, of titanium, wherein such metal substrate has a surface profile resulting from a combination of one macro-rough profile and one micro-rough profile.

Particularly advantageous is the combination wherein the average roughness of the micro-rough profile is comprised between 5 and 20% of the average roughness of the macro-rough profile. Here and in the following description, the term average roughness (Ra) indicates the arithmetic average of the absolute deviations from the average surface level, in relation to a smooth horizontal surface.

In the case of real measurements, it is evident that any instrumental measurement is limited to a pre-defined spatial bandwidth. This implies that some features are too wide (or far) to be determined, and others too narrow (or near). For this reason, when defining the measured roughness parameters, the band-width to which the measurement refers, expressed according to the specific surface width range set up on the instrument, will be specified therewith.

The average roughness of the micro-rough profile of the present invention is of at least 5 micrometers and, preferably, of 20 micrometers, basis respectively a profilometer upper threshold limit of 10 micrometers and a profilometer lower threshold limit of 7.5 micrometers.

As regards the peak frequency and relevant thresholds, the present invention does not require any particular care. It has indeed been found that satisfactory results can be obtained either with the roughness of EP 0 407 349 (average roughness combined with a controlled peak frequency) or with the combination of macro and micro-roughness of the present invention.

The fact that the peak frequency (or population of peaks) is no more a critical parameter implies a highly simplified procedure for the achievement of the macro-rough profile, now requiring just an average roughness control. Particularly, in the specific case when surface roughness is produced by sandblasting, the working times are considerably lowered, the equipment control parameters are largely less critical and, most of all, the metal surface results substantially free from harmful defects produced by micro-cracks or bendings. Furthermore, the reduced working times produce a lower metal hardening and, consequently, lower warping phenomena, thus making a subsequent annealing treatment optional. Therefore, even when the macro-rough profile is obtained by sandblasting, the metal can be directly subjected to the subsequent stage of micro-rough profile formation. Should the object under treatment have planarity requisites of particular concern and the macro-rough profile be obtained by sandblasting, an annealing treatment may be advisable. In the case of titanium, the latter may be carried out at 500-750° C. and preferably at 550-700° C. for a time typically ranging from 1 to 2 hours. Since this treatment is usually made—to simplify the procedure—in atmosphere of air, the metal results oxidised superficially. In the specific case of titanium, the oxide film would strongly interfere with the subsequent micro-rough profile production stage. After the thermal treatment, the metal needs thus to be subjected to a chemical attack (etching) whose parameters (type of acid, concentration, temperature, operation time) are set up to achieve a complete dissolution of the oxide film, without altering however the micro-rough profile produced by sandblasting.

Examples of acids suitable for this purpose are hydrochloric acid 15-25% by weight, at a temperature ranging from 80° C. to the boiling point and for contact times of 30 to 40 minutes, and the mixture nitric acid 30-40% hydrofluoric acid 3-5%, at room temperature and for times of 5-15 minutes.

Molten salt baths can be successfully used as well. It is understood that the macro-rough profile can be advantageously obtained even by acid etching rather than with the sandblasting procedure.

A particularly suitable kind of acid for this type of attack is 15-25% (more preferably 20%) by weight hydrochloric acid, at a temperature ranging from 90° C. to the boiling point. The etching time is normally higher than the one indicated for the previous case (necessarily limited as aimed at dissolving the mere oxide layer formed during the thermal treatment) and it is preferably comprised between 1 and 2 hours. It has been found that the suitable average roughness is achieved when the metal weight loss is comprised between 100 and 1000 grams per square meter of surface in contact with the acid, preferably between 400 and 500 grams per square meter.

To the macro-rough profile thus obtained, a micro-rough profile is overlapped, which, in the case of titanium and in absence of oxide layers, previously removed by the hydrochloric acid (or by the aforementioned nitric acid/hydrofluoric acid mixtures or molten salt baths) can be successfully produced with oxalic or sulphuric acid. These acids corrode the valve metals, and particularly titanium, through a slow mechanism, presumably due to the formation of intermediates consisting of adsorbed anionic complexes. This adsorption gives rise to the equalisation of the metal surface with a substantial reduction of the specific effects of acceleration or deceleration in the dissolution speed associated, for example, to the crystallographic orientation of the crystals and to defects of the crystalline order such as dislocations. As a consequence, the attack is not only slow but also relatively even and capable of producing a micro-roughness overlapped to the pre-existing macro-rough profile which is not substantially altered. It has been found out that the optimum micro-roughness is the one characterised by an average value of 5-20%, preferably 8-10% of the macro-roughness average value. Thus, for instance, with an average macro-roughness value of 30-70 micrometers the best adhesions of catalytic coatings are obtained when the micro-roughness average value is comprised between 2 and 7 micrometers. These optimum conditions are achieved, for example, with 20-30% by weight sulphuric acid, or with 20% by weight oxalic acid, preferably at temperatures from 80° C. to the boiling point and with times from 1 to 3 hours.

Without wishing to be bound to any particular explanation of the effectiveness of the present invention, a possible rationale may be based on the following points:

The micro-rough profile permits the interpenetration between the catalytic coating and the metal substrate, which ensures a good mechanical stability, however without allowing uncoated metal peaks to surface out of the coating. As the catalytic coatings may have a thickness of 5-10 micrometers, it is easily understood why an average micro-roughness of 2-7 micrometers, as stated above, results optimal.

The macro-rough profile ensures a high surface development, that is the real surface is much higher than the projected one, so that the electric current is more distributed and the evolution of gas, in particular of oxygen, is less concentrated. The consequence is a lower mechanical stress on the catalytic coating. The combined effect of the higher mechanical stability (due to the micro-roughness) and the lower mechanical stress (due to the macro-roughness) leads to a substantial increase in the operating lifetime of the electrode of the invention in particular when used as the anode, even under critical conditions in terms of acidity, temperature, electric current.

The good mechanical adhesion, finally, makes the formation of micro-defects at the interface between the catalytic coating and the metal substrate less probable. As micro-defects of this kind usually constitute the points of nucleation of passivating corrosion products, their substantial absence further contributes to increasing the operating lifetime.

The following examples demonstrate some practical embodiments of the invention, referring to anodes for oxygen evolution obtained by catalytic activation of titanium substrates; obviously it is to be understood that the same principle may be applied for increasing the adhesion of other types of electrocatalytic coatings, for example of coatings for the anodic evolution of chlorine, and also for coating applied to a different matrix, for instance on nickel substrates for the production of hydrogen evolving cathodes.

EXAMPLE 1

A sheet of titanium grade 1 according to ASTM B 265, 0.2 cm thick, with a surface of 35 cm×35 cm, was degreased with acetone, rinsed with demineralised water and dried with air. The sheet was then subjected to shot-blasting with iron gravel GL 18 and to an annealing treatment for 2 hours at 550° C. Subsequently, a first etching was carried out in 20% hydrochloric acid, at boiling temperature, for 10 minutes.

The sheet was then washed with demineralised water under pressure an subjected to a roughness check. An average roughness of 21 micrometers, with 18 peaks per centimeter was detected, basis a profilometer upper threshold limit of 10 micrometers and a lower threshold limit of 7.5 micrometers.

A final etching was then carried out in 27% by weight sulphuric acid, at 90° C. for 180 minutes. At the end of this treatment, it was found that the pre-existing macro-rough profile was substantially unaltered, and a further micro-rough profile of 1.5 micrometers average, as demonstrated by the micrographic analysis, was overlapped thereto.

The sheet was then activated with a coating of tantalum and iridium oxide, with a weight ratio of 65:35 referred to the metals and with a total loading of 24 g/m$^2$. The coating was applied according to the prior art teachings, starting from an acidic solution of the chlorides of the two metals, applied to the substrate by brushing and decomposed in air at 525° C.

The sheet thus obtained was then cut into samples which were characterised as anodes in a 150 g/l sulphuric acid solution, at 60° C., under oxygen evolution. An anodic potential of 1096 mV at 3 kA/m$^2$, and of 1120 mV at 10 kA/m$^2$, was detected. Subsequently a life test under oxygen evolution was carried out at 30 kA/m$^2$ with the same electrolyte and with a cathode for hydrogen evolution as the counter electrode, taking as an acceptance criteria the overall cell voltage: in other words, a determination of the time in which the cell voltage, initially of about 4.5 V, exceeded the threshold of 8 V, has been carried out. For the above referenced samples, an average value of 3120 hours was obtained.

EXAMPLE 2

A sheet of titanium grade 1 according to ASTM B 265, 0.2 cm thick, with dimensions of 35 cm×35 cm, was degreased with acetone, rinsed with demineralised water and dried with air. The sheet was then subjected to sandblasting with a mixed jet of sand and water.

A first etching in 20% hydrochloric acid was carried out at boiling temperature, for 10 minutes.

The sheet was then washed with demineralised water under pressure, and subjected to a roughness check. An average roughness of 20 micrometers, with 19 peaks per centimeter, was detected, basis a profilometer upper threshold limit of 10 micrometers and a lower threshold limit of 7.5 micrometers.

A final etching in 20% by weight di-hydrated oxalic acid was carried out at boiling temperature, for 60 minutes.

At the end of this treatment, the pre-existing macro-rough profile resulted substantially unaltered, a further micro-rough profile of 1 micrometer average being overlapped thereto, as demonstrated by the micrographic analysis.

The sheet was then activated by the same coating of tantalum and iridium oxides of the previous example. The sheet thus obtained was cut into samples with dimensions of 2 cm×2 cm which were characterised as anode in a 150 g/l sulphuric acid solution, at 60° C., under oxygen evolution. An anodic potential of 1100 mV at 3 kA/m$^2$, and of 1126 mV at 10 kA/m$^2$ was detected. A life-test was then carried out as in the previous example, whereby an average lifetime of 3050 hours was detected.

EXAMPLE 3

A sheet of titanium grade 1 according to ASTM B 265, 0.2 cm thick, with dimensions of 35 cm×35 cm, was degreased with acetone, rinsed with demineralised water and immersed in 25% by weight hydrochloric acid, at 95° C. for 180 minutes.

At the end of the treatment, a weight loss of 600 g/m$^2$ was detected, equivalent to the dissolution of about 150 micrometers of metal. The sheet was then washed with demi water and dried.

The average macro-rough profile resulted of 30 micrometers, with 41 peaks per centimeter, basis a profilometer upper threshold of 10 micrometers and a lower threshold limit of 7.5 micrometers. A final acid etching was carried out in 30% by weight sulphuric acid, at 95° C., for 180 minutes.

At the end of the treatment, the pre-existing macro-rough profile resulted substantially unaltered, a further micro-rough profile of 6 micrometers average being overlapped thereto, as demonstrated by the micrographic analysis.

The sheet was then activated with the same coating of tantalum and iridium of the previous examples.

The sheet thus obtained was cut into samples which were subjected to the life-test described in Example 1.

The average lifetime resulted to be 2200 hours.

EXAMPLE 4

A mesh of titanium grade 1 according to ASTM B 265, 1.5 cm thick with dimensions of 100 cm×50 cm (real to projected surface ratio equal to 2.2), was degreased with acetone, rinsed with demineralised water and immersed in 20% by weight hydrochloric acid, at 85° C. for 120 minutes. During this treatment the mesh lost a total weight of 200 grams per square meter of real surface, equivalent to about 50 micrometers of dissolved metal. At the end of the treatment the sheet was washed with demi water, dried and subjected to roughness measurement.

The average macro-rough profile resulted of 10 micrometers, with 35 peaks per centimeter, basis a profilometer upper threshold limit of 10 micrometers and a lower threshold limit of 7.5 micrometers. The final acid etching was carried out in 20% by weight sulphuric acid, at 90° C. for 120 minutes. At the end, the pre-existing macro-rough profile resulted substantially unaltered, a further micro-rough profile of 1 micrometer average being overlapped thereto, as demonstrated by the micrographic analysis.

The mesh was subsequently activated with the same coating of tantalum and iridium oxides of the preceding examples, then cut into samples subjected to the life-test described in Example 1.

The average lifetime resulted to be 2450 hours.

COUNTER EXAMPLE 1

An electrode was prepared according to the following procedure, corresponding to the prior art: one sheet of titanium grade 1 according to ASTM B 265, 0.2 cm thick, with a surface of 35 cm×35 cm, was degreased with acetone, rinsed with demineralised water and dried with air. The sheet was then subjected to shot-blasting with iron gravel GL 18 and normalised for 2 hours at 550° C. Subsequently, etching was carried out in 20% hydrochloric acid at boiling temperature, for 30 minutes. The sheet was then washed with demineralised water under pressure, and subjected to a roughness check. An average roughness profile of 20 micrometers, with 19 peaks per centimeter, basis a profilometer upper threshold limit of 10 micrometers and a lower threshold limit of 7.5 micrometers, was detected.

At the end of the above pre-treatment, the substrate was activated with the same coating of tantalum and iridium oxides of the previous examples. The electrode thus obtained was characterised as anode in a sulphuric acid solution at 150 g/l, at 60° C., under oxygen evolution. An anodic potential of 1095 mV at 3 kA/m², and of 1121 mV at 10 kA/m², was detected. A life-test was then carried out as in the previous examples, whereby a lifetime 600 hours was determined.

COUNTER EXAMPLE 2

Three electrodes were prepared according to the following procedure, corresponding to the prior art: three sheets of titanium grade 1 according to ASTM B 265, 0.2 cm thick, with a surface of 35 cm×35 cm, were degreased with acetone, rinsed with demineralised water and dried with air. The sheet was then subjected to shot-blasting with iron gravel GL 18 and normalised for 2 hours at 550° C.

All the three samples were subsequently subjected to etching in 20% hydrochloric acid at boiling temperature, for 30 minutes.

The sheets were then washed with demineralised water under pressure, and subjected to roughness check. On the three samples an average roughness profile comprised between 19 and 21 micrometers was detected, with 16-18 peaks per centimeter, basis a profilometer upper threshold limit of 10 micrometers and a lower threshold limit of 7.5 micrometers. On the three samples an interlayer was then applied based on titanium and niobium oxides in a molar ratio of 9:1 obtained by applying one hand of a mildly acidic water-based paint containing the chlorides of the two metals and calcining in air at 450° C., repeating the procedure four times.

The roughness profile was subsequently re-checked, whereby values comprised between 15 and 17 micrometers, with 16-18 peaks per centimeter were detected.

The samples were then activated with the same coating of tantalum and iridium oxides of the previous examples, and characterised as anodes in a sulphuric solution at 150 g/l, at 60° C., under oxygen evolution. An anodic potential comprised between 1095 and 1106 mV at 3 kA/m², and of 1120-1033 mV at 10 kA/m², was detected. A life-test was then carried out as in the previous examples, whereby lifetimes of 2600, 2420 and 675 hours were detected respectively.

The invention claimed is:

1. An electrolysis process for gas evolution comprising the electrolytic evolution of at least one gaseous product on the surface of at least one electrode comprising titanium with a surface profile resulting from the combination of a first macro-rough profile and a second micro-rough profile thereon, and an electrocatalytic coating applied to said metal substrate, the average roughness of the micro-rough profile being comprised between 5 and 20% of the average roughness of the macro-rough profile.

2. The process of claim 1 wherein, said at least one gaseous product is selected from the group consisting of oxygen, chlorine and hydrogen.

3. The process of claim 1 wherein the said electrocatalytic coating comprises at least one noble metal or an oxide thereof.

4. A process for electroplating of a metal from an aqueous solution thereof with evolution of at least a gaseous product on the surface of at least one electrode comprising titanium with a surface profile resulting from the combination of a first macro-rough profile and a second micro-rough profile thereon, and an electrocatalytic coating applied to said metal substrate, the average roughness of the micro-rough profile being comprised between 5 and 20% of the average roughness of the macro-rough profile.

5. The process of claim 4 wherein said at least one gaseous product is oxygen.

6. The process of claim 4 wherein said gas evolution takes place at a current density higher than 10 kA/m².

7. The process of claim 4 wherein said gas evolution takes place in an electrolyte containing fluoride ions.

* * * * *